United States Patent [19]

Brandenstein et al.

[11] Patent Number: 4,660,997
[45] Date of Patent: Apr. 28, 1987

[54] ROTATION-DAMPING ROLLING BEARING

[75] Inventors: Manfred Brandenstein, Eussenheim; Rudiger Hans, Niederwerrn, both of Fed. Rep. of Germany

[73] Assignee: SKF GmbH, Schweinfurt, Fed. Rep. of Germany

[21] Appl. No.: 763,804

[22] Filed: Aug. 8, 1985

[30] Foreign Application Priority Data

Aug. 8, 1984 [DE]  Fed. Rep. of Germany ... 8423565[U]

[51] Int. Cl.⁴ .................... F16C 27/06; F16C 33/78
[52] U.S. Cl. .................................. 384/490; 384/484
[58] Field of Search ............. 384/450, 490, 477, 484, 384/485, 488, 436, 523, 515, 535, 563, 614

[56]  References Cited

U.S. PATENT DOCUMENTS

| | | | |
|---|---|---|---|
| 2,588,636 | 3/1952 | Korsgren | 384/536 |
| 3,501,209 | 3/1970 | Ende | 384/563 |
| 3,552,812 | 1/1971 | Howe, Jr. | 384/536 X |
| 3,752,544 | 8/1973 | Hay | 384/484 |
| 3,801,171 | 4/1974 | Rozentals | 384/536 X |
| 4,387,938 | 6/1983 | Brandenstein et al. | 384/490 |

Primary Examiner—John M. Jillions
Assistant Examiner—David Werner
Attorney, Agent, or Firm—Rosen, Dainow & Jacobs

[57] ABSTRACT

A rotation-damping rolling bearing is provided with a damping element between a cover or sealing disk and a row of rolling elements. The damping element can be integrally formed with a cover disk, vulcanized on the support body of the sealing disk, integrally formed with the support, or connected to the sealing disk separate from the support. The sealing disk is provided with a flexible sealing lip. The damping element contacts the rolling bodies with axial prestress.

21 Claims, 4 Drawing Figures

ROTATION-DAMPING ROLLING BEARING

FIELD OF THE INVENTION

The invention relates to a rotation-damped rolling bearing of the type having a damping element.

BACKGROUND OF THE INVENTION

Rolling bearings of the foregoing type may be advantageously employed where the usual radial play of an undamped rolling bearing leads to radial oscillation and consequently to rattling noise and other undesirable phenomena. Rotation-damped rolling bearings are used in machine construction and in vehicle technology where slow or small rotary motion or rotary oscillation occurs and an increased resistance to rolling is acceptable. A bearing for this application can, for example, be a conventional ball bearing provided with a negative bearing play, i.e. prestress. In accordance with this construction, however, account must also be taken of the unavoidable rattling noise caused by the individual balls as a result of manufacturing tolerances.

U.S. Pat. No. 4,387,938 discloses a rolling bearing ring which is provided with discontinuous shoulders. Annular damping elements which protect against twisting are arranged in this region, which elastically abut against the rolling bodies. In this way a rotation-damping rolling bearing is achieved, without interruption of its function, but in which a specially constructed ring must be provided.

SUMMARY OF THE INVENTION

The object of the invention is to provide an inexpensive, cageless rotation-damping rolling bearing of the aforementioned type wherein the inner and outer rings and rolling bodies can be constructed in the conventional manner and whereby each individual rolling body is damped independently of manufacturing tolerances.

The object is achieved by the provision of a damping element arranged between the cover or sealing disk and the rolling bodies such that the damping element lies against the rolling bodies with a prestress directed substantially axially. The damping element can, for example, be a detachable O-ring pressed against the rolling bodies with axial prestress by the cover or sealing disk. During rotation of the bearing the rolling bodies slide against this projection, whereby a braking movement is produced, and whereby each individual rolling body is advantageously biased to be held in its position.

According to an advantageous preferred embodiment of the invention the damping element is connected to the cover or sealing disk.

The damping element is therefore a component of the bearing seal and accordingly can advantageously be easily replaced or simply added to bearings of conventional construction. The cover or sealing disk is arranged in a known way in the area of the shoulders, rims or side surfaces of one of the bearing rings. The invention resides in the provision of, for example, an annular projection which is fastened to the disk and contacts the rolling bodies. This projection is not visible when in a sealed bearing space and also requires no additional space outside the sealed bearing space.

In accordance with a further embodiment of the invention, the damping element is formed by an annular projection on the support of the cover disk. Frequently, the rolling bearings are provided with sealing disks which comprise a rigid support, for example, made of sheet metal and a pliant elastic seal. In other cases, only one rigid cover disk is provided which, with a corresponding surface, forms a sealing gap therebetween. In accordance with the invention, a projection is provided bent at an angle toward the rolling bodies and in sliding contact therewith.

In accordance with further embodiments of the invention, the damping element is made of plastically deformable material and is joined to the support or the cover disk, whereby the damping element and a sealing lip can be made of the same material and fastened together on the support by vulcanization or the like.

BRIEF DESCRIPTION OF THE DRAWINGS

These and other preferred embodiments of the invention will now be described in detail with reference to the drawings. These drawings show partial longitudinal sections of ball bearings with a pair of rings and balls arranged therebetween, the bearing space for the different embodiments being closed by sealing or cover disks, wherein.

DETAILED DESCRIPTION OF THE PREFERRED EMBODIMENTS

Figures 1, 2:
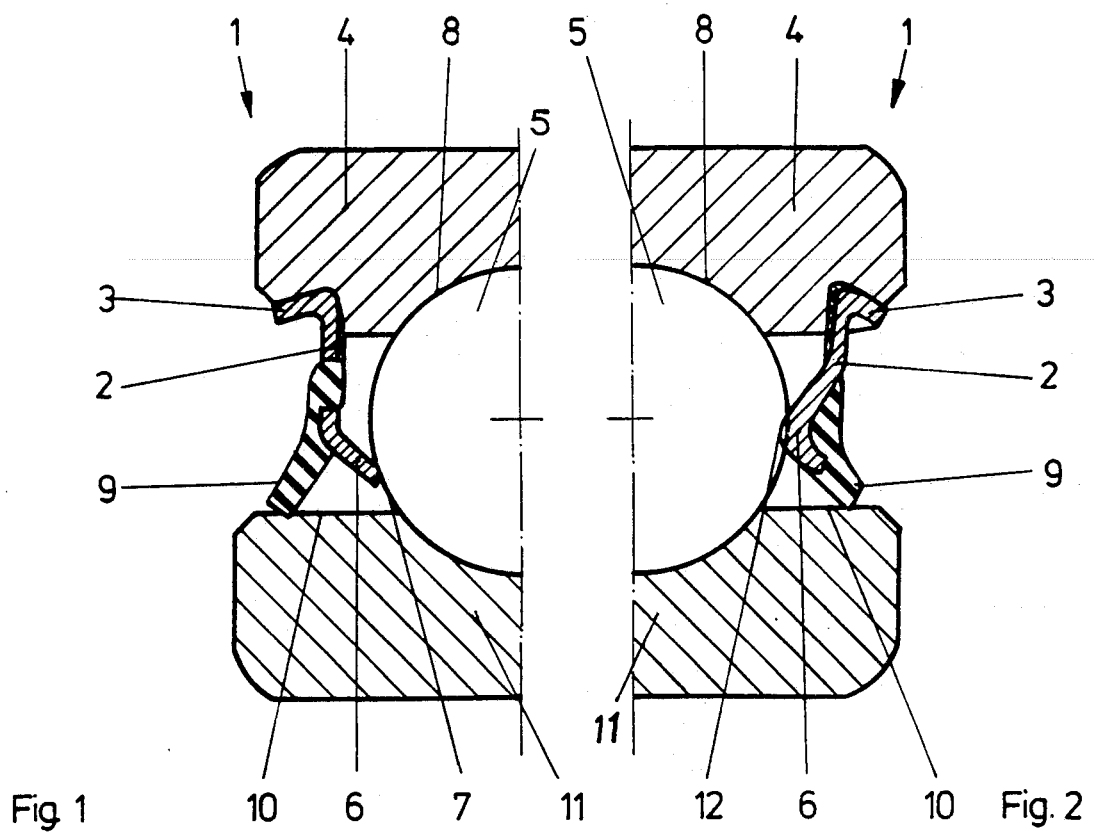
FIG. 1 shows a metal support with sheet metal damping element directed at an angle toward the rolling elements.
FIG. 2 shows a metal support with a toroidal damping element.

The sealing disk 1 illustrated in FIG. 1 is comprised of a sheet metal support 2. One edge region of the support 2 is a substantially V-shaped flange 3 seated in a groove formed in a shoulder of a bearing ring 4. The flange 3 is angled or bent toward the axially outer side of the ball bearing. The outer end region of the support 2 comprises a damping element 6 which is angled or bent in the direction of the balls 5, and lies against the balls with prestress due to the bending elasticity of the sheet metal. In order that the balls 5 will not be damaged, the surface 7 of the damping element 6 adapted to contact the balls is shaped to conform to the shape of the balls. The prestress acts essentially in the axial direction of the ball bearing, so that the balls 5 are supported in the associated raceway 8. During rotation of the ball bearing, i.e. during relative rotation of the bearing rings 4, 11 with respect to each other, under these conditions a braking moment is produced by the damping element. A sealing lip 9 made of pliant elastic material is fastened to the support 2 by vulcanization or the like, for example, with suitable holes provided in the support as illustrated. The sealing lip 9 forms a contact seal with the shoulder surface 10 of the other bearing ring 11. The other side (not shown) of the ball bearing can be provided with a similar arrangement of sealing disk 1 and damping element 6.

FIG. 2 illustrates a sealing disk 1, the sheet metal support 2 of which has a toroidal contact surface 12. By this means an adequate surface quality is achieved also in the unmachined condition. In this embodiment, the damping element 6 is integrally formed with the support 2.

Figures 3, 4:
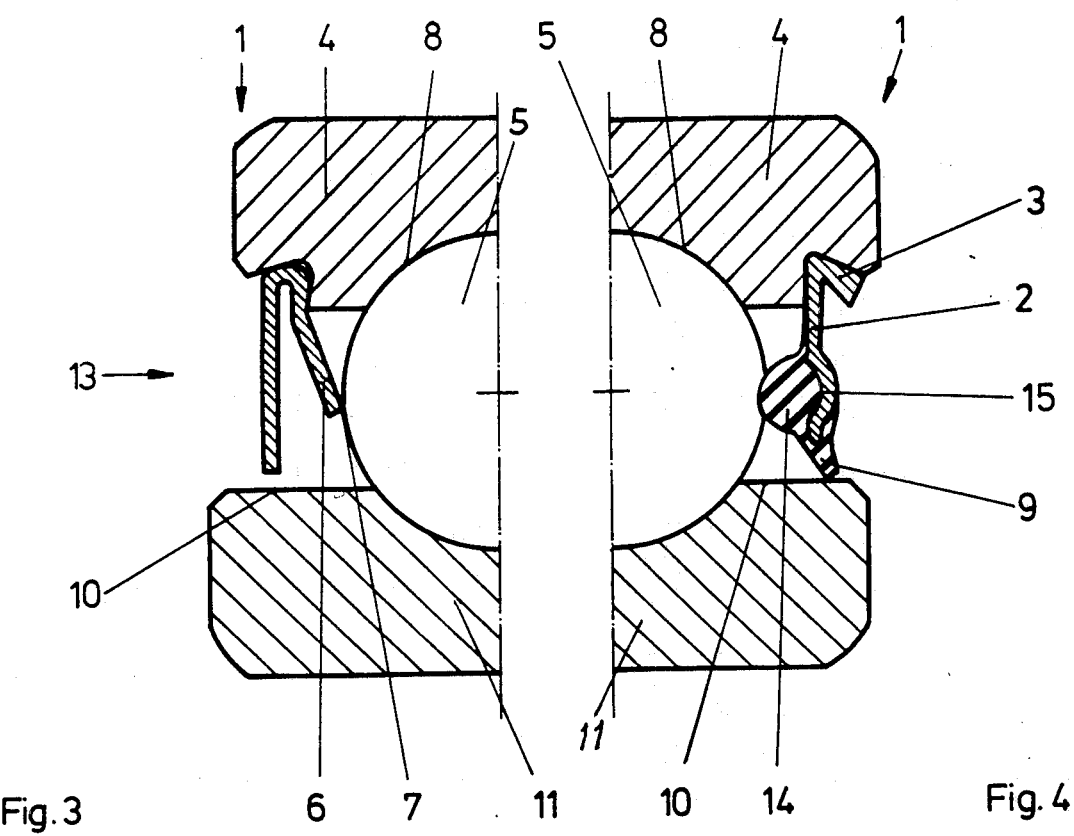
FIG. 3 shows a cover disk with a damping element directed at an angle toward the rolling elements.
FIG. 4 shows a cover disk with a damping element made of plastically deformable material.

In FIG. 3 the ball bearing has a sheet metal cover disk 13, which forms a sealing gap with the shoulder surface 10 of the other ring 11. In the area of the groove formed in the ring 4, the cover disk 13 is folded and provided with a circumferential flange which is angled in the direction of the balls 5 to form the damping element 6. In this way contact with the balls 5 is produced as in the embodiment of FIG. 1.

In accordance with the embodiment depicted in FIG. 4, the sealing disk 1 comprises a sheet metal support 2 and having flange 3 integrally formed therewith, on which support an annular damping element 14 made of plastic material is vulcanized along with the sealing lip 9. The damping element has an almost circular profile and is fastened to the support 2 by vulcanization. In the area of vulcanization, extra secure holding of the damping element 14 is achieved by form-locking in a corresponding annular groove 15 formed in the support 2. The damping element 14 is sufficiently thick in the axial direction to effect the necessary elastic compliance for producing the prestress. In order that the functioning of the sealing lip is not affected, the support 2 according to this embodiment does not contribute to the elasticity of the damping element.

As already noted with respect to FIG. 1, a second seal or cover disk of any type, with or without a damping element, can be provided on the other side of the bearing in accordance with each preferred embodiment.

As illustrated in FIG. 1, the groove in the bearing ring 4 for receiving the flange 3 has a generally radially extending surface extending from the bore of the bearing ring, and joined to a surface extending axially outwardly of the bearing and inclined to the axis of the bearing, toward the other bearing ring. This permits the flange 3, which conforms to the shape of the groove, to be snapped into the groove and held therein to permit the damping element 6 to engage the balls with prestress.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

We claim:

1. In a cageless rotation-damping rolling bearing comprising an inner ring defining an inner race, an outer ring defining an outer race, and a row of rolling bodies arranged in said races between said rings; the improvement wherein said races are annular and circumferentially uninterrupted and further comprising an annular disk secured to one of said rings and axially spaced from said races, said annular disk comprising an annular damping element extending therefrom between said disk and said rolling bodies and contacting said rolling bodies with a substantially axial prestress.

2. The rolling bearing of claim 1 wherein said disk is a cover disk.

3. The rolling bearing of claim 1, wherein said disk is a sealing disk.

4. The rolling bearing of claim 1 wherein said disk comprises a support and said damping element comprises an annular projection on said support.

5. The rolling bearing of claim 3, wherein said sealing disk comprises a support and said damping element is joined to said support, said damping element being of a plastically deformable material.

6. The rolling bearing of claim 2, wherein said damping element is of a plastically deformable material and is connected to said cover disk.

7. The rolling bearing of claim 4, wherein said disk further comprises a sealing lip, said damping element and said sealing lip being made of the same material and fastened together on said support.

8. The rolling bearing of claim 5, wherein said sealing disk further comprises a sealing lip, said damping element and said sealing lip being of the same material and fastened together on said support.

9. The rolling bearing of claim 2, wherein said damping element is integrally formed with said cover disk.

10. In a cageless rotation-damping rolling bearing comprising an inner ring defining an inner race, an outer ring defining an outer race, and a row of rolling bodies arranged in said races between said rings; the improvement wherein said races are annular and circumferentially uninterrupted and further comprising an annular disk secured to one of said rings and extending toward the other of said rings, said annular disk being axially spaced from said races, said annular disk comprising an annular damping element depending therefrom, said damping element extending axially between said disk and said rolling bodies and contacting said rolling bodies with a substantially axial prestress.

11. The rolling bearing of claim 10 wherein said outer ring has a groove within which said outer race is formed, and an annular shoulder in said groove and axially displaced from said outer race, said annular disk comprising a sheet metal disk seated in said groove.

12. The rolling bearing of claim 11 wherein said shoulder is substantially V-shaped, and said sheet metal disk has a substantially V-shaped flange seated in said groove.

13. The rolling bearing of claim 11 wherein said sheet metal disk has an axially inwardly extending portion defining said damping element, said annular disk further comprising annular sealing means extending radially inwardly to form a seal with said inner ring.

14. The rolling bearing of claim 13 wherein said sheet metal disk has a U-shaped cross section with a central portion seated in said groove, one arm having an axially inwardly extending portion defining said damping element, and the other arm extending radially inwardly and defining a seal with said inner race.

15. The rolling bearing of claim 13 wherein said damping element comprises a radially inner edge of said sheet metal disk.

16. The rolling bearing of claim 13 wherein said damping element comprises a toroidal extension on said sheet metal disk.

17. The rolling bearing of claim 13 wherein said sealing means comprises an elastic material affixed to said sheet metal disk.

18. The rolling bearing of claim 11 wherein said damping element comprises an annular plastic material.

19. The rolling bearing of claim 16 wherein said annular plastic material has a substantially circular cross section.

20. The rolling bearing of claim 16 wherein said annular plastic material has a radially inwardly extending portion defining a seal with said inner ring.

21. The rolling bearing of claim 11 wherein said shoulder has a portion inclined to the axis of said bearing and sheet metal disc has a surface inclined to the axis of said bearing and engaging said inclined portion of said shoulder, whereby said sheet metal disk may be snapped into engagement with said shoulder to permit said damping element to engage said rolling elements with axial prestress.

* * * * *

UNITED STATES PATENT AND TRADEMARK OFFICE
CERTIFICATE OF CORRECTION

PATENT NO. : 4,660,997
DATED : April 28, 1987
INVENTOR(S) : Manfred Brandenstein et al.

It is certified that error appears in the above-identified patent and that said Letters Patent is hereby corrected as shown below:

Column 4, line 55, change "claim 16" to --claim 18--.

Column 4, line 58, change "claim 16" to --claim 18--.

Signed and Sealed this

Seventeenth Day of November, 1987

Attest:

DONALD J. QUIGG

Attesting Officer

Commissioner of Patents and Trademarks